(No Model.)
F. A. STRONG.
LUBRICATOR.
No. 330,525. Patented Nov. 17, 1885.
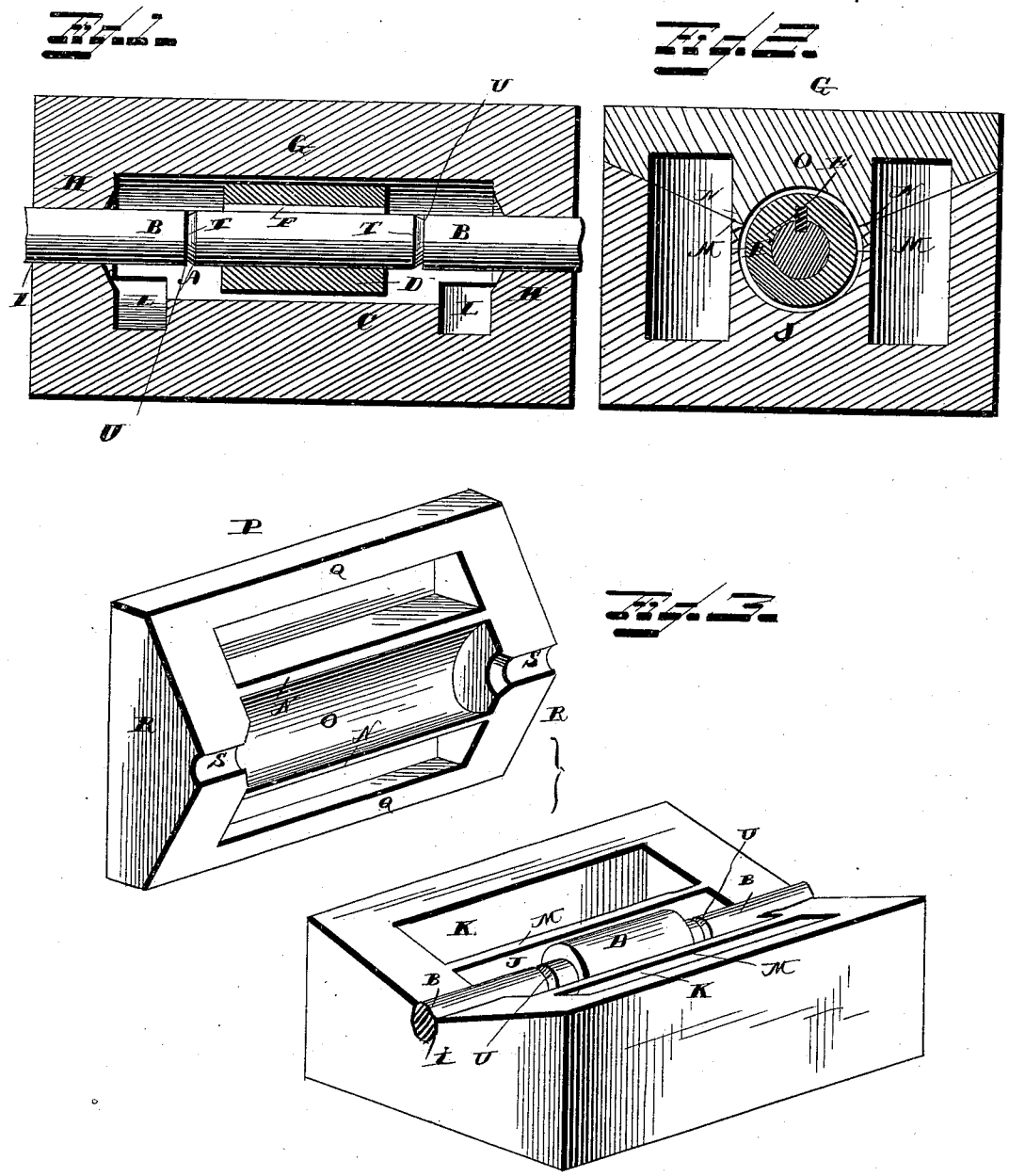

UNITED STATES PATENT OFFICE.

FRANCIS AUGUSTUS STRONG, OF COLEBROOK, WISCONSIN.

LUBRICATOR.

SPECIFICATION forming part of Letters Patent No. 330,525, dated November 17, 1885.

Application filed September 5, 1885. Serial No. 176,277. (No model.)

*To all whom it may concern:*

Be it known that I, FRANCIS A. STRONG, of Colebrook, in the county of Waushara and State of Wisconsin, have invented certain new and useful Improvements in Lubricators; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical longitudinal view of my improved bearing. Fig. 2 is a cross-section of the same, and Fig. 3 is a perspective view of the bearing with the cap shown removed.

Similar letters of reference indicate corresponding parts in all the figures.

My invention has relation to boxes or bearings for shafts or axles; and it consists in the improved construction and combination of such a box or bearing, in which the shaft will run continually immersed in oil or other lubricant, and in which the said lubricant cannot be thrown out of the box by the centrifugal force through the joints between the box and the cap, as hereinafter more fully described and claimed.

In the accompanying drawings, the letter A indicates the shaft, which has two reduced portions, B B, which pass through the ends of the box C, and one enlarged portion, D, which is inside of the box. The reduced portions of the shaft may be of the same thickness as the shaft, and the enlarged portion may consist in a sleeve secured upon the shaft by means of a groove and key, E and F, or in any other suitable manner; or the shaft may be reduced at the points at which it passes through the ends of the box, and the enlargement may be of the normal size of the shaft, which latter form is only used when the shaft is of sufficient thickness to allow it to be reduced at the ends of the box without any danger of weakening it. The upper edges of the box and the end pieces of the box (respectively lettered G and H) are beveled or inclined toward the shaft and toward the perforations I, in the end pieces of the box, through which the shaft passes, the said apertures fitting perfectly tight around the shaft; and a half-bearing, J, projects from the bottom of the box, extending longitudinally, and forms the lower support for the enlarged portion of the shaft, forming a true bearing for the same. Spaces K K are formed at both sides of this bearing, and channels L L are cut transversely through the ends of the bearing, at the bottom of the box, so as to allow the lubricant contained in the box to flow from one side of the box to the other. The upper edges of the half-bearing are beveled downwardly and divergingly, as shown at M M, and the correspondingly-beveled lower edges, N N, of an upper half-bearing, O, fit upon these beveled edges, the said upper half-bearing projecting longitudinally from the under side of the cap P, the side edges, Q Q, of which are beveled or inclined to fit the inclined edges of the box, and the end pieces, R R, of which are cut off inclined to correspond to the end pieces of the box, the end pieces of the cap having longitudinal recesses S S, fitting upon the upper halves of the reduced portions of the shaft, forming, together with the corresponding recesses in the end pieces of the box, the apertures I. The enlargement upon the shaft does not extend the entire length of the bearing, and the shaft has two grooves, T T, a short distance from the ends of the enlargement, the said grooves being annular and having their bottoms beveled outward, so as to form inwardly-facing straight shoulders U, as plainly shown in Fig. 2. By having the edges of the bearings beveled the oil or other lubricant which might be thrown out by the centrifugal force from the enlargement will be forced to flow down toward the bottom of the box, and in the same manner any lubricant which might be thrown out in the box will flow down upon the inwardly-inclined edges of the box and cap, so that no lubricant can find its way out of the box. The box is filled with lubricant up to the shaft or above the bottom of the lower bearing, and the shaft will continually be lubricated, for the reason that the lubricant will flow from one side of the box to the other and from one part of the box back to the bottom, where it will always maintain a level above the bottom of the lower bearing. The beveled grooves around the reduced parts of the shaft, or rather the shoulders formed by these grooves, will prevent the lubricant from driving along the axle toward the apertures at the ends of the box, the shoulders stopping the drifting oil and allowing it to drop back into the bottom of the box. In this manner the consumption of oil or other lubricant in this bearing will be very small, inasmuch as all the lubricant will run back into the bottom of the box and again do service, so that the only lubricant which will be consumed will be what is destroyed by the friction and heat created between the enlargement upon the shaft and its bearing, and this friction and heat will be very small, inasmuch as the greater part of the enlargement will continually be immersed in lubricant. When the enlargement is secured upon the shaft, instead of being integral with the same, a new enlargement may be placed upon the shaft when the old one is worn out, so that there will be no wear upon the shaft proper, but only upon the enlargement, which, if secured with a groove and key, as shown, or by a similar simple method, may be very easily removed and replaced by another. It follows that with the necessary changes the same principle may be carried out in wheel-hubs, axle-boxes, or similar axle or shaft bearings, and that, also, vertical shafts may be provided with enlargements of the shaft, and be incased in boxes, which will keep the shaft immersed in lubricant continually.

Having thus described my invention, I claim and desire to secure by Letters Patent of the United States—

1. The combination, with a lubricating bearing-box, of a shaft having grooves around its periphery, so as to form annular shoulders facing said bearing-box, substantially as and for the purpose set forth.

2. The combination, with a shaft, of a box having longitudinal bearings projecting from its bottom and from the under side of its cap, having downwardly and divergingly beveled edges, and having upwardly-diverging beveled or inclined edges at the upper edges of the box and the lower edges of the cap, as and for the purpose shown and set forth.

3. The combination, with a shaft, of a box having a longitudinal bearing projecting from its bottom, having spaces formed in the bottom at both sides of the bearing, and having transverse channels through the ends of the bearing at the bottom of the box, connecting the said spaces, as and for the purpose shown and set forth.

4. The combination of the box having the upper edges of its sides upwardly and divergingly beveled, and having its end pieces cut inclined toward axial recesses, and provided with a longitudinal bearing projecting from the middle of its bottom, and having channels cut transversely through the ends of the bearing connecting the spaces at the sides of the bearing, a cover having its side edges beveled to fit upon the edges of the box, and having its end pieces cut off inclined to fit upon the ends of the box, and provided with a longitudinal half-bearing projecting from its under side, and a shaft having reduced portions passing through the ends of the box, and having an enlargement fitting between the bearings and formed with grooves around the reduced portions of the shaft, beveled to form inwardly-facing annular shoulders, as and for the purpose shown and set forth.

In testimony that I claim the foregoing as my own I have hereunto affixed my signature in presence of two witnesses.

FRANCIS AUGUSTUS STRONG.

Witnesses:
JAMES O. MOORE,
MOSES S. WANT.